(12) United States Patent
Sharma

(10) Patent No.: US 11,734,532 B2
(45) Date of Patent: Aug. 22, 2023

(54) TWO-DIMENSIONAL BAR CODES THAT ARE BOTH INTENSITY-MODULATED AND ORIENTATION-MODULATED FOR TRANSMITTING SENSITIVE INFORMATION ALONG WITH NON-SENSITIVE INFORMATION

(71) Applicant: University of Rochester, Rochester, NY (US)

(72) Inventor: Gaurav Sharma, Webster, NY (US)

(73) Assignee: University of Rochester, Rochester, NY (US)

(*) Notice: Subject to any disclaimer, the term of this patent is extended or adjusted under 35 U.S.C. 154(b) by 0 days.

(21) Appl. No.: 17/505,081

(22) Filed: Oct. 19, 2021

(65) Prior Publication Data

US 2022/0129654 A1 Apr. 28, 2022

Related U.S. Application Data

(60) Provisional application No. 63/106,472, filed on Oct. 28, 2020.

(51) Int. Cl.
*G06K 7/14* (2006.01)
*G06K 19/06* (2006.01)

(52) U.S. Cl.
CPC ..... *G06K 7/1417* (2013.01); *G06K 19/06037* (2013.01)

(58) Field of Classification Search
CPC ............... G06K 7/1417; G06K 7/1434; G06K 19/06037

USPC ........................................................ 235/462.1
See application file for complete search history.

(56) References Cited

U.S. PATENT DOCUMENTS

| 5,710,420 A * | 1/1998 | Martin ............. G06K 19/06018 235/487 |
| 7,328,851 B1 * | 2/2008 | Iftime ...................... G06K 7/12 235/494 |
| 9,378,445 B2 * | 6/2016 | Stuck .................... B23K 26/048 |
| 2008/0110995 A1 * | 5/2008 | Iftime ..................... C09D 11/34 235/494 |
| 2010/0060942 A1 * | 3/2010 | Monga ............... H04N 1/32352 358/3.28 |
| 2010/0060943 A1 * | 3/2010 | Monga ................... G06K 1/121 358/3.28 |
| 2019/0311165 A1 * | 10/2019 | Seitz .................. G06K 7/10722 |
| 2021/0103786 A1 * | 4/2021 | Yoshida ........... G06K 19/06131 |

OTHER PUBLICATIONS

Alipay. 2019. "Alipay Barcode Payment: Introduction." https://intl.alipay.com/doc/barcode.
Aloul, F., S. Zahidi, and W. El-Hajj. 2009. "Two Factor Authentication Using Mobile Phones." In IEEE/Acs Intl. Conf. Comp. Sys. and Applic., 641-44. do:10.1109/AICCSA.2009.5069395.

(Continued)

*Primary Examiner* — Paultep Savusdiphol
(74) *Attorney, Agent, or Firm* — Mark H. Jay

(57) ABSTRACT

A dual-modulated QR code (DMQR code) is in the format of a conventional QR code but uses elongated markers instead of black squares in the code modules. The positions of the markers within the DMQR code represent a nonconfidential primary message, and the orientations of the markers within the modules of the DMQR code represent a confidential secondary message.

7 Claims, 13 Drawing Sheets

(56) References Cited

OTHER PUBLICATIONS

Apple. "AVMetadataMachineReadableCodeObject—AVFoundation | Apple Developer Documentation." https://developer.apple.com/documentation/avfoundation/avmetadatamachinereadablecodeobject.
"CIQRCodeFeature—Core Image | Apple Developer Documentation." https://developer.apple.com/documentation/coreimage/iqrcodefeature.
Arce, Nicole. 2015. "Motorola Updates Camera and Gallery Apps, Now Allows QR Code Scanning and Saving Albums to MicroSD." http://www.techtimes.com/articles/80661/20150831.
Balzarotti, D., M. Cova, and G. Vigna. 2008. "ClearShot: Eavesdropping on Keyboard Input from Video." In IEEE Symp. Secur. and Privacy, 170-83. doi:10.1109/SP.2008.28.
Bulan, O., and G. Sharma. 2011. "High Capacity Color Barcodes: Per Channel Data Encoding via Orientation Modulation in Elliptical Dot Arrays." IEEE Trans. Image Proc. 20 (5): 1337-50. doi:10.1109/TIP.2010.2092437.
Bulan, O., G. Sharma, and B. Oztan. 2011. "High Capacity Image Barcodes Using Color Separability." In Proc. SPIE: Color Imaging XVI: Displaying, Processing, Hardcopy, and Applications, 7866:7866-N, 1-9. doi:10.1117/12.872215.
Bulan, Orhan, Vishal Monga, and Gaurav Sharma. 2012. "Capacity Analysis for Orthogonal Halftone Orientation Modulation Channels." IEEE Trans. Image Proc. 21 (1): 405-11. doi:10.1109/TIP.2011.2155078.
Bulan, Orhan, Gaurav Sharma, and Vishal Monga. 2010. "Orientation Modulation for Data Hiding in Clustered-Dot Halftone Prints." IEEE Trans. Image Proc. 19 (8): 2070-84. doi:10.1109/TIP.2010.2046795.
Cioffi, John M. n.d. "Chapter 10: System Design with Codes." In Class Reader for Stanford University Ee 379b-Digital Communication Ii: Coding. https://ee.stanford.edu/~cioffi/doc/book/chap10.pdf.
Dinesh, Karthik, Jiangfeng Lu, Shingirai Dhoro, and Gaurav Sharma. 2019. "Channel-Wise Barcodes for Color Display Applications." J. Electronic Imaging, No. 3(May/Jun.): 033021-1-18. doi:10.1117/1.JEI.28.3.033021.
Duo. n.d. "Guide to Two-Factor Authentication." https://guide.duo.com/.
Farrell, Joyce E., Peter B. Catrysse, and Brian A. Wandell. 2012. "Digital Camera Simulation." Appl. Opt. 51 (4). OSA: A80-A90. doi:10.1364/AO.51.000A80.
Gilmore, Jim. 2014. "The Frontline Interviews: Glenn Greenwald." https://www.pbs.org/wgbh/pages/frontline/government-elections-politics/united-states-of-secrets/the-frontline-interview-glenn-greenwald/.
Google. "Barcode API Overview." https://developers.google.com/vision/android/barcodes-overview.
Guo, J., C. Su, Y. Liu, H. Lee, and J. Lee. 2012. "Oriented Modulation for Watermarking in Direct Binary Search Halftone Images." IEEE Trans. Image Process. 21 (9): 4117-27. doi:10.1109/TIP.2012.2198221.
Hall, E.T. 1966. The Hidden Dimension. New York, NY: Doubleday.
Holmes, Ryan. 2017. "Why the "Hidden" Update in Apple's Latest IOS Changes the Rules of Marketing." https://www.forbes.com/sites/ryanholmes/2017/10/30/why-the-hidden-update-in-apples-latest-ios-changes-the-rules-of-marketing/#354c27a73d0a.
"ISETCam." https://github.com/ISET/isetcam.
ISO/IEC. 2006. "Information Technology—Automatic Identification and Data Capture Techniques—QR Code 2005 Bar Code Symbology Specification." http://www.iso.org/iso/iso_catalogue/catalogue_ics/catalogue_detail_ics.htm? csnumber=43655.
2013. "ISO/IEC 18092:2013 Information technology—Telecommunications and information exchange between systems—Near Field Communication—Interface and Protocol (NFCIP-1)." http://standards.iso.org/ittf/PubliclyAvailableStandards/c056692_ISO_IEC_18092_2013.zip.
2015. "ISO/IEC 18004:2015: Information Technology—Automatic Identification and Data Capture Techniques—QR Code Bar Code Symbology Specification." https://www.iso.org/standard/62021.html.
Johannesson, R., and K.S. Zigangirov. 1999. Fundamentals of Convolutional Coding. Institute of Electrical; Electronics Engineers.
Kitanovski, V., and M. Pedersen. 2016. "Orientation Modulation for Data Hiding in Chrominance Channels of Direct Binary Search Halftone Prints" J. Imaging Sci. and Tech. 60 (5). Society for Imaging Science; Technology: 50407-1.
2018. "Detection of Orientation-Modulation Embedded Data in Color Printed Natural Images." J. Imaging 4 (4). Multidisciplinary Digital Publishing Institute: 56.
Leggate, James. 2019. "Big Brother Watching You? These Are the World's Most Heavily Surveilled Cities." https://www.foxbusiness.com/technology/cities-under-most-surveillance-world.
"Scanning a QR Code from Samsung phone." https://www.samsung.com/au/support/mobile-devices/samsung-qr-code-scanner/.
"Secure Password Generator." https://passwordsgenerator.net/.
Sharma, G. 2016. "Image-Based Data Interfaces Revisited: Barcodes and Watermarks for the Mobile and Digital Worlds." In 8th Intl. Conf. on Comm. Sys. and Networks (COMSNETS), 1-6. Bangalore, India. doi:10.1109/COMSNETS.2016.7440021.
Shukla, D., and V. V. Phoha. 2019. "Stealing Passwords by Observing Hands Movement." IEEE Trans. Inf. Forensics Security 14 (12): 3086-3101. doi:10.1109/TIFS.2019.2911171.
"SQRC." https://www.denso-wave.com/en/system/qr/product/sqrc.html.
Tepper, Fitz. 2017. "The IPhone's Camera App Can Now Read QR Codes." https://techcrunch.com/2017/06/05/the-iphones-camera-app-can-now-read-qr-codes/.
Tkachenko, I., W. Puech, C. Destruel, O. Strauss, J. Gaudin, and C. Guichard. 2016. "Two-Level QR Code for Private Message Sharing and Document Authentication." IEEE Trans. Inf. Forensics Security 11 (3): 571-83. doi:10.1109/TIFS.2015.2506546.
Walmart. 2019. "Walmart Pay." https://www.walmart.com/cp/walmart-pay/3205993.
WeChat. 2019. "QR Code Payment." https://pay.weixin.qq.com/wechatpay_guide/qrcode_payment.shtml.
"What Is SQRC (Secret-Function-Equipped QR Code)?" http://denso-adc.com/learning-center/what-is-sqrc.
Wilson, S.G. 1996. Digital Modulation and Coding. Upper Saddle River, NJ, USA: Prentice Hall.
Xu, Yi, Jared Heinly, Andrew M. White, Fabian Monrose, and Jan-Michael Frahm. 2013. "Seeing Double: Reconstructing Obscured Typed Input from Repeated Compromising Reflections." In Proc. ACM Sigsac Conf. Comput. & Commun. Secur., 1063-74. CCS '13. New York, NY, USA: ACM. doi:10.1145/2508859.2516709.
Yuan, T., Y. Wang, K. Xu, R. R. Martin, and S. Hu. 2019. "Two-Layer QR Codes." IEEE Trans. Image Process. 28 (9): 4413-28. doi:10.1109/TIP.2019.2908490.
"ZBar Bar Code Reader." http://zbar.sourceforge.net/.
"ZBar Bar Code Reader." https://github.com/ZBar/ZBar.
"ZXing C++ Port." https://github.com/glassechidna/zxing-cpp.

\* cited by examiner

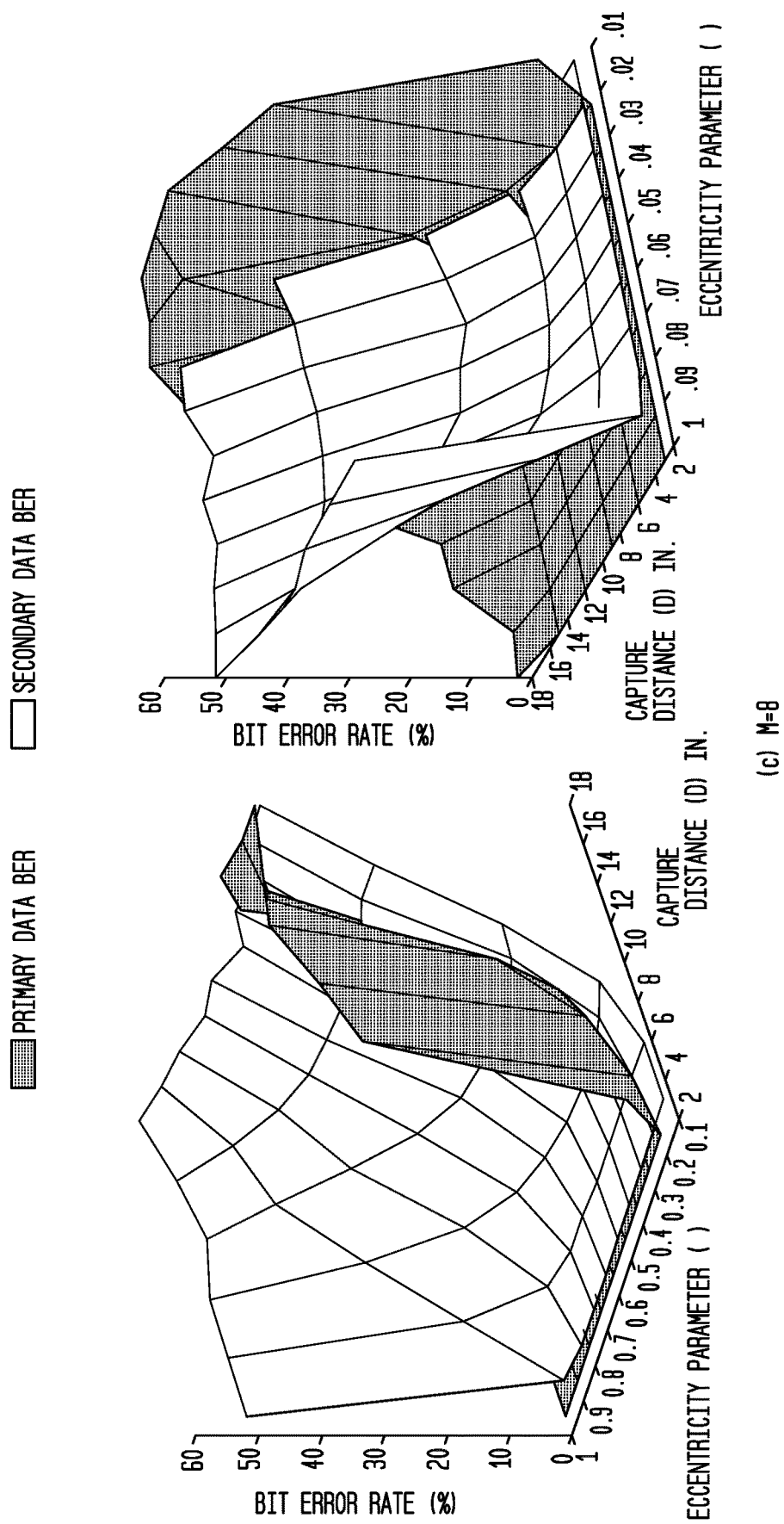

*FIG. 8*
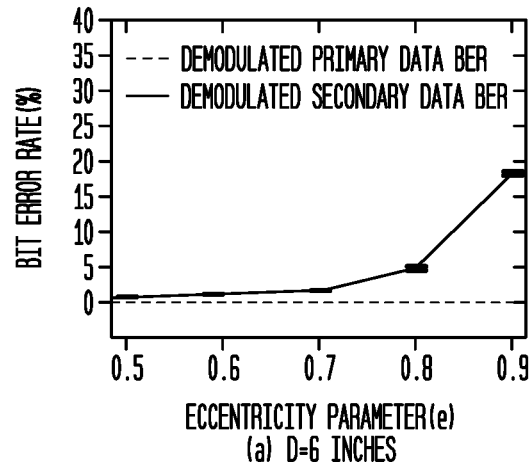
(a) D=6 INCHES
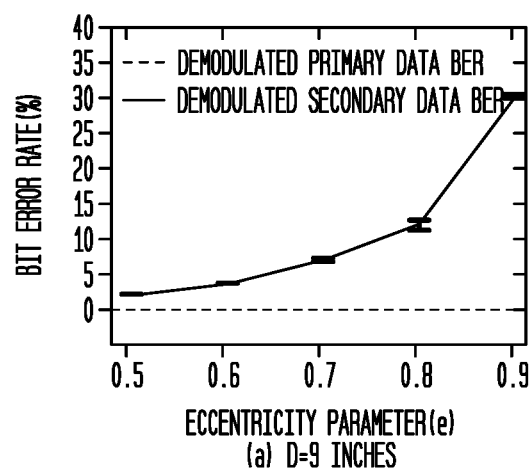
(a) D=9 INCHES
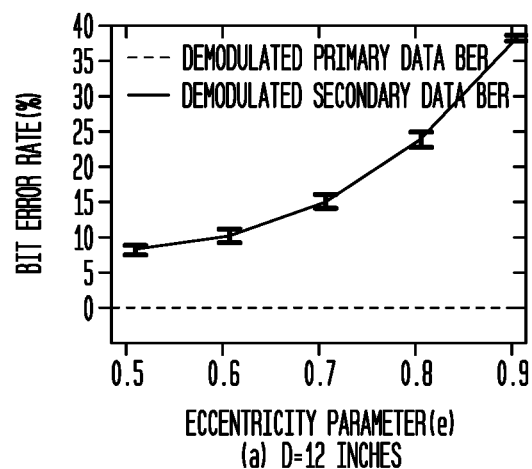
(a) D=12 INCHES

FIG. 9
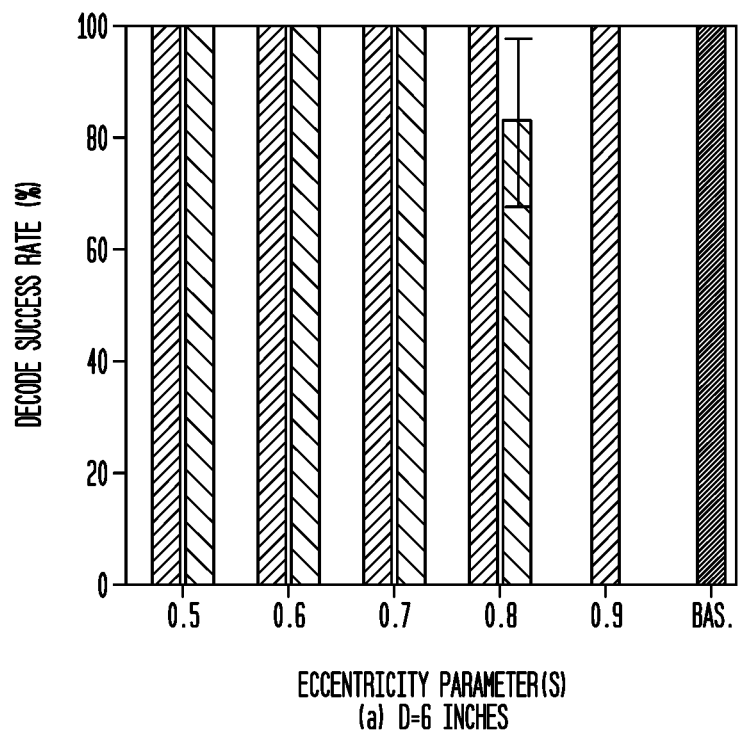
(a) D=6 INCHES
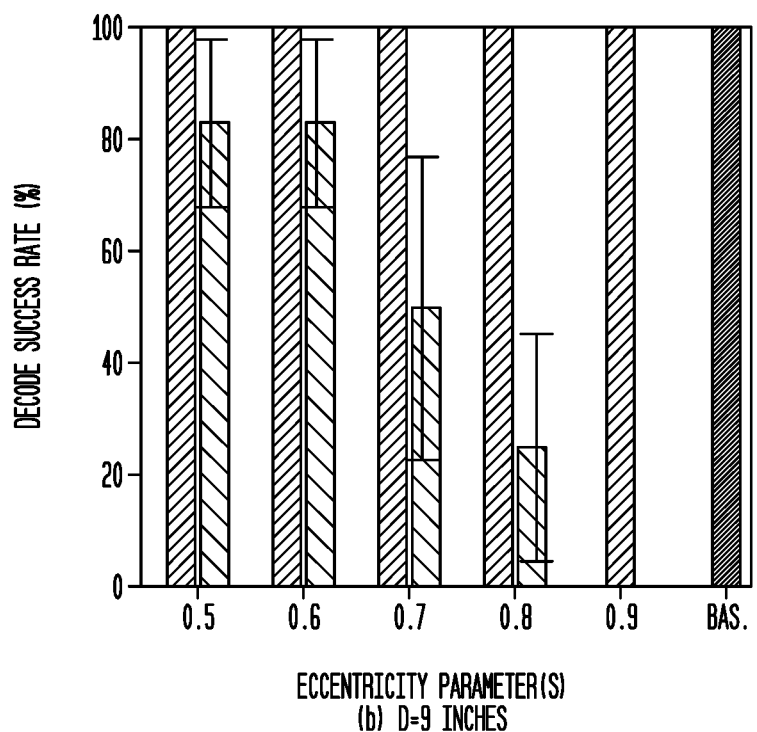
(b) D=9 INCHES

FIG 9 CONT.
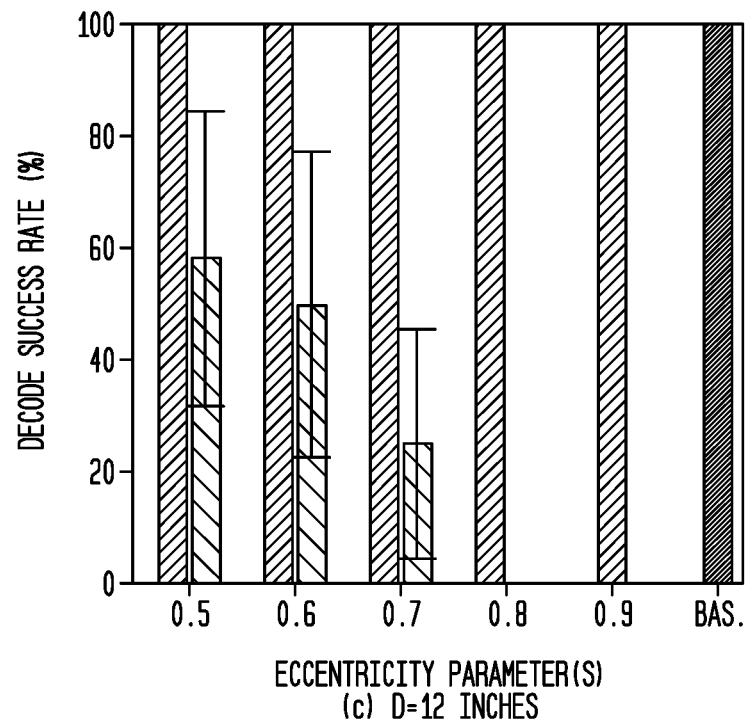
(c) D=12 INCHES
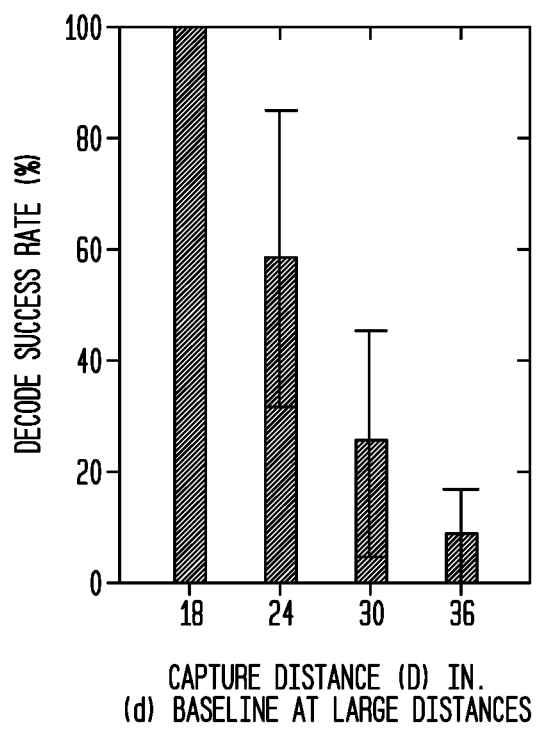
(d) BASELINE AT LARGE DISTANCES

TWO-DIMENSIONAL BAR CODES THAT ARE BOTH INTENSITY-MODULATED AND ORIENTATION-MODULATED FOR TRANSMITTING SENSITIVE INFORMATION ALONG WITH NON-SENSITIVE INFORMATION

GOVERNMENT RIGHTS

This invention was made with government support under grant number EEC-1559970 awarded by the National Science Foundation. The government has certain rights in the invention.

BACKGROUND OF THE INVENTION

The invention relates to two-dimensional bar codes, and more specifically relates to two-dimensional bar codes that transmit a non-confidential primary message (such as a website address) and a confidential secondary message (such as a website user ID and/or password). In its most immediate sense, the invention relates to QR codes that can transmit the secondary message only to a video camera that is close to a video screen on which the QR code is displayed.

When a user enters a secure website (such as an email account or bank account) with his smartphone or tablet computer it is usually necessary to input a non-secure primary message (such as a website address) and a secure secondary message (such as a User ID and/or password) into a computer system. This is often done by inputting the secondary message on the keyboard of the smartphone or tablet computer. While this allows the user to enter the website, the secondary message can be obtained by a remotely located third party who trains a video camera on the keyboard or on the user's hands.

It would be advantageous to provide a user of a cellphone or a tablet computer with a way to enter a primary and a secondary message into a computer system while maintaining the security of the secondary message from a video camera trained on the screen of the cellphone or tablet computer.

One object of the invention is to provide a user of a cellphone or tablet computer with a way to input a primary and a secondary message into a computer system without the need to type on a keyboard.

Another object of the invention is to provide a way for such a user to input a primary and a secondary message into a computer system without making an electrical connection with the computer system.

Still another object of the invention is to provide a way for such a user to input a primary and a secondary message into a computer system by displaying encoded versions of the primary and secondary messages on the screen of the cellphone or tablet computer and bringing the screen near a video camera that is operatively connected to the computer system.

The invention proceeds from the realization that a two-dimensional bar code, and specifically a conventional QR code can be modified to permit a video camera located close to a video screen to capture both the primary and secondary messages, while preventing a remotely located video camera from capturing the secondary message. The modification involved is the use of an elongated colored marker (advantageously, an elliptical black dot) instead of the square black marker used in two-dimensional bar codes, including QR codes. The area of the marker is less than the area of the module in which the marker is located. Even though the video screen does not display the marker with high resolution, a video camera located close to the video screen can detect the orientation of the marker within its module. But, if the video camera is spaced far apart from the video screen, this detection cannot be reliably made. Hence, in accordance with the invention, elongated colored markers do double duty. The positions of the markers represent the primary message, and the orientations of the markers represent the secondary message.

In accordance with the invention, the primary message is encoded into the locations of the markers (the markers are "intensity-modulated" because a marker is either present or absent from each module in the bar code) and the secondary message is encoded into the orientation of the markers (the markers are also "orientation-modulated"). In the presently preferred embodiment, the intensity modulation occurs first and the orientation modulation happens afterward, using the intensity-modulated representation of the primary message as an input.

The secondary message is unreadable by a remote video camera because the markers are not captured by the remote cameras with high resolution. At a remotely located video camera, the orientation of a marker within a module is indiscernible, even though it may be feasible to identify the presence or absence of a marker within the module, as is done for a two-dimensional bar code. But if the camera is close to the video screen on which the marker is displayed, the orientation of the marker is evident, thereby permitting the secondary message to be decoded.

The maximum spacing between the video screen and the video camera at which the secondary message can be reliably decoded is determined by the size of the marker relative to the distance to the video marker. If the marker is relatively tiny, the camera and screen must be close to each other. If the marker is relatively large, the camera and screen can be placed further apart.

Significantly, the encoded primary message can be decoded using bar code decoders. This is because a non-blank marker-containing module is sufficiently dark that a conventional bar code decoder will read it as a square that is substantially darker than blank modules that do not contain a marker.

Advantageously, the markers are elliptical. In one embodiment, all the markers have the same shape and size. In another embodiment, the eccentricity of each marker is maintained while varying the size in accordance with the orientation of the marker. This improves decodability.

BRIEF DESCRIPTION OF THE DRAWINGS

The invention will be better understood in correction with the exemplary and non-limiting drawings, in which:

FIG. 8 illustrates the actual accuracy (expressed as Bit Error Rate, or BER) with which the primary and secondary messages in DMQR codes in accordance with the invention can be read in various experimental conditions using convolutional codes;

FIG. 9 illustrates the actual accuracy (expressed as Decoding Success Rate, or DSR) of DMQR codes in accordance with the preferred embodiment of the invention as compared with conventional QR codes under various experimental conditions.

DETAILED DESCRIPTION OF PREFERRED EMBODIMENTS

As a preliminary matter, the below-described preferred embodiment is a type of QR code. This is because of the ubiquity with which QR codes are used. However, persons skilled in the art know that a QR code is merely a specific type of two-dimensional bar code that is square in shape and has a predefined format. Other two-dimensional bar codes exist. For example, an Aztec code is a two-dimensional bar code commonly used for transportation applications such as airline tickets, a Datamatrix code is a two-dimensional bar code used for small items, goods, and documents, and a PDF417 code is a two-dimensional bar code used to store large quantities of data. A conventional two-dimensional bar code is made up of a multiplicity of square regions ("modules"), which may be left entirely blank or marked entirely black with a square black marker. While the herein-described preferred embodiment is a type of QR code, a person skilled in the art will understand that the invention can be implemented in any type of two-dimensional bar code, specifically including Aztec, Datamatrix, and PDF417 codes. A QR bar code format is not required to practice the invention.

The preferred embodiment described in the following detailed description is described as a dual-modulated QR code, or DMQR. This is because the preferred embodiment has the format of a QR code but is both intensity-modulated and orientation-modulated. Furthermore, the marker described below is consistently identified as a black dot in the shape of an ellipse. This is presently preferred, but is not required. Other colors can be used instead, provided that the coloration is sufficiently intense, and the marker shape need not be elliptical or a dot, but rather need only be elongated. Advantageously, the size of each dot can be determined by the orientation of the dot; dots that are oriented other than horizontally or vertically can have larger sizes than dots that are oriented horizontally and vertically. This improves decodability. Additionally, the herein-described application runs on a cellphone and the cellphone optically communicates with a laptop webcam. Although this is presently preferred, neither a cellphone nor a laptop webcam is necessary for the practice of the invention. Any electronic device with a video screen (e.g. a tablet computer or a video monitor) can be used to display a code in accordance with the invention and any electronic device with a video camera can be used to receive a code in accordance with the invention.

Figure 1:
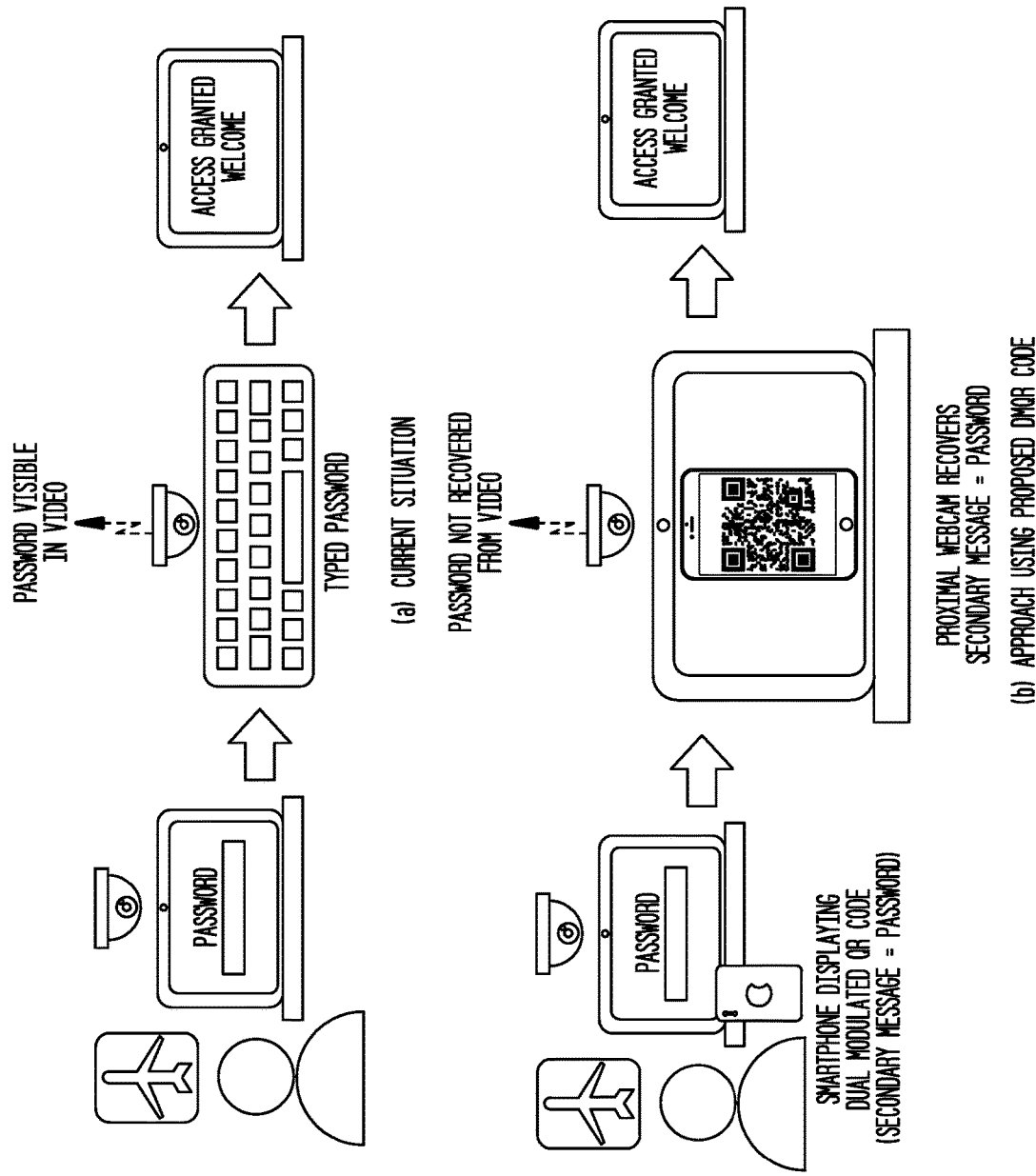
FIG. 1 schematically illustrates how the invention can be used to overcome a security problem that presently exists when a user accesses a website while in view of a video camera.

FIG. 1(a) illustrates the current situation: a user's password is revealed in captured surveillance video when they enter it on a keyboard in a public setting, seriously compromising their private information. FIG. 1(b) illustrates the alternative enabled by the proposed DMQR codes. The user logs on by displaying a DMQR code on their mobile device that carries the password (obtained from a secure password vault on the smartphone) as the secondary data. The DMQR code is captured from a close distance by the webcam of the device that the user wishes to log on to and the secondary data corresponding to the password is readily recovered from the captured image allowing the user to log on. The surveillance cameras on the other hand can only capture the DMQR codes from a larger distance and therefore the password information cannot be recovered from the captured surveillance images/video.

Figure 2:
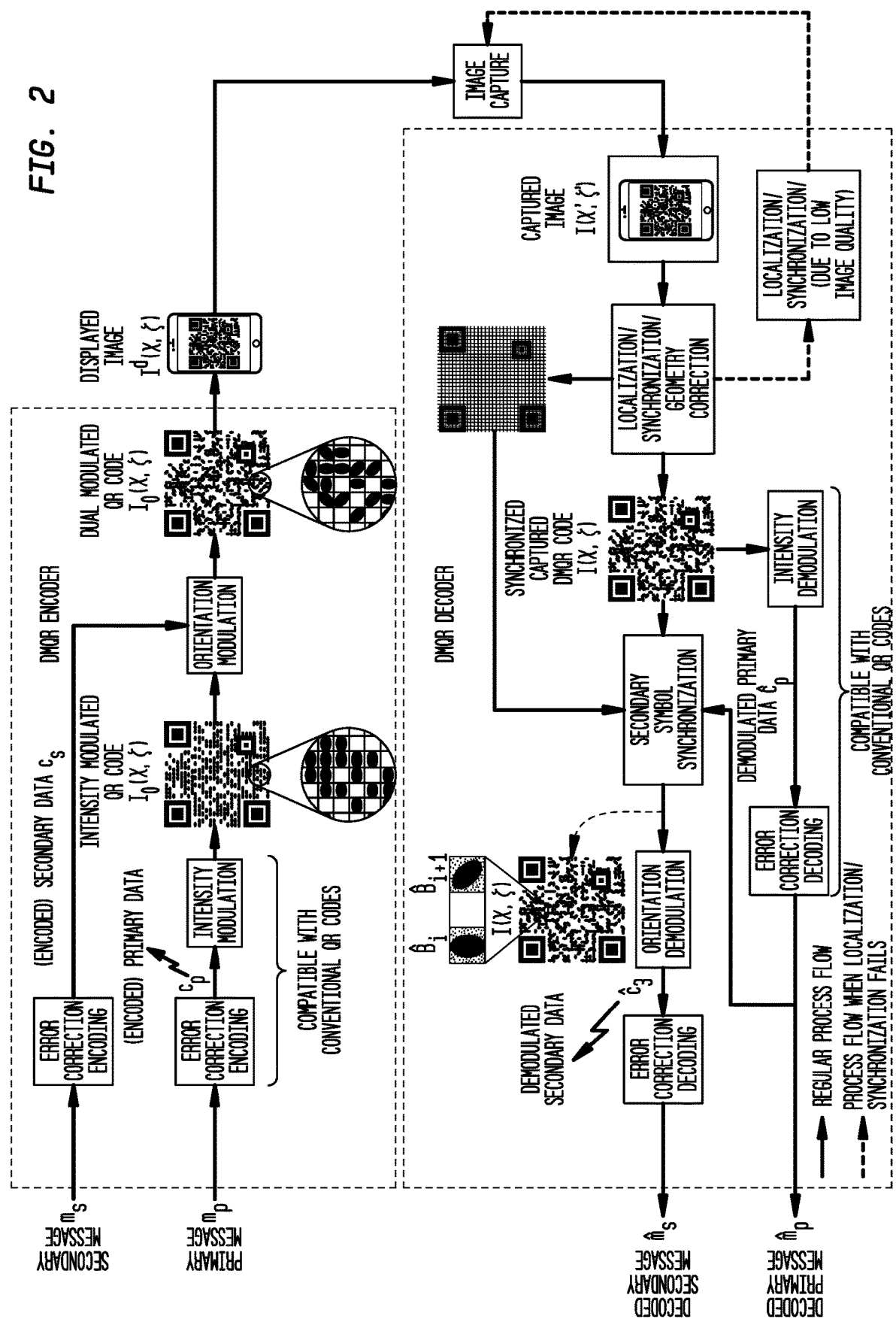
FIG. 2 is a high-level schematic representation of an encoder and a decoder that can produce and read a DMQR code in accordance with the preferred embodiment of the invention.

DMQR codes in accordance with the invention use intensity and orientation modulation to embed primary and secondary data, respectively. FIG. 2 provides an overview of the encoder and decoder for DMQR codes. The DMQR codes use synchronization and alignment patterns identical to those for conventional QR codes and also the same geometry of modules that carry individual bits of data. Within each module, primary data is embedded via intensity modulation, which is compatible with conventional QR code detection. Specifically, depending on the bit to be embedded in the module, the module is either left blank or an elliptical black dot is placed within it. Additionally, for each module containing an elliptical dot, secondary data is embedded by orientation modulation; that is, by using different orientations for the elliptical dots. The secondary data is recovered at the decoder by estimating the orientations of the elliptical dots.

The top half of FIG. 2 depicts the encoding process for the DMQR code. Both the primary and the secondary messages are first encoded with error correction codes (such encoding is conventional in the QR code art) and the resulting (encoded) primary and secondary data are then modulated into the DMQR code.

The primary message embedding procedure for DMQR codes is analogous to and compatible with conventional QR code encoding. In particular, synchronization patterns, alignment patterns, and the geometry of data carrying modules are all identical to those in traditional QR codes. In FIG. 2, in the image labeled "Intensity Modulated QR Code" (and other similar images), the standard QR code synchronization patterns can be seen as the three distinctive identical patterns in the top-left, top-right, and bottom right corners comprising of a hollow outer square with an inner solid square and the alignment pattern can be seen as the similar but smaller pattern located a little inside on the bottom right side. Together the synchronization and alignment patterns define the geometry of the modules used for the data embedding which are shown as the squares in the same image, bounded by dotted lines. The primary message $m_p$ first goes through an error correction encoding as per the QR code standard 2015. "ISO/IEC 18004:2015: Information Technology—Automatic Identification and Data Capture Techniques—QR Code Bar Code Symbology Specification." https://www.iso.org/standard/62021.html that yields the (encoded) primary data $c_p$, with added redundancy for enabling error recovery. The primary data $c_p$ is then embedded in the barcode pattern using intensity modulation. Specifically, bits of data from $c_p$ are embedded in individual data carrying modules of the QR code; based on the (0/1) value of the bit being embedded; either a black elliptical dot is placed in the module or it is left blank (empty). As with conventional QR codes 2015. "ISO/IEC 18004:2015: Information Technology—Automatic Identification and Data Capture Techniques—QR Code Bar Code Symbology Specification." https://www.iso.org/standard/62021.html, prior to this embedding the bits are XOR-ed with one of eight possible binary mask patterns to reduce runs of identical consecutive values and to ensure roughly equal numbers of zeros and ones. Bits to identify the mask and the error correction encoding are also included in the data embedded in the modules so that the decoder can use the same mask to undo the XOR operation and also perform appropriate error correction decoding. Conceptually, this embedding procedure can be understood as producing an intensity modulated QR code represented by $\tilde{I}_0(\chi, \zeta)$, where $(\chi, \zeta)$ represent the coordinate axes, aligned with the module grid. Thus far, the procedure for creating a barcode from the primary message is identical in all respects to that used for creating conventional QR codes, except that conventional QR codes make the entire module black or blank whereas the DMQR codes reduce the magnitude of intensity modulation by replacing the black modules with black elliptical dots within the modules. Because of the commonalities with conventional QR codes, the DMQR codes inherit several of the beneficial properties of classic QR codes, viz., robust localization and synchronization, perspective distortion correction, and various levels of selectable error correction capability. Also, as long as the intensity modulation magnitude is appropriate, the embedded primary message can be directly decoded with a conventional QR code decoder. Importantly, the size of the embedded elliptical dot in comparison to the module size determines the magnitude of intensity modulation, a parameter discussed below. In the discussion below, the spatial support of the $i^{th}$ module containing a black elliptical dot is represented as $\mathcal{B}_i$, for $1 \leq i \leq N_B$, with $N_B$ representing number of modules containing black elliptical dots.

The procedure for embedding the secondary message involves modulating the orientation of the black elliptical dots resulting from the primary data modulation within their corresponding $N_B$ modules. First, the secondary message $m_s$ undergoes error correction encoding, which adds redundancy to allow for error recovery, and yields (encoded) secondary data $c_s$. The secondary data $c_s$ is represented as a string of $N_B$ M-ary symbols $c_{s,1}, c_{s,2}, \ldots, c_{s,N_B}$, where $c_{s,i} \in \{0, 1, \ldots (M-1)\}$. Based on the value taken by the M-ary symbol $c_{s,i}$, the major-axis orientation angle $\phi_{c_{s,i}}$ for the elliptical dot in the $i^{th}$ module $\mathcal{B}_i$ is determined as, $$\phi_{c_{s,i}} = \frac{\pi c_{s,i}}{M}.$$

Specifically, if $\Delta$ denotes the length of either side of the square modules and $(\chi_0^i, \zeta_0^i)$ denote the coordinates of the center of the $i^{th}$ module $\mathcal{B}_i$, the region satisfying the constraint $$\frac{((\chi-\chi_0^i)\cos\phi_{c_{s,i}} + (\zeta-\zeta_0^i)\sin\phi_{c_{s,i}})^2}{\Delta^2} + \frac{((\chi-\chi_0^i)\sin\phi_{c_{s,i}} - (\zeta-\zeta_0^i)\cos\phi_{c_{s,i}})^2}{(\epsilon\Delta)^2} \leq 1,$$

is rendered as the black elliptical dot within the extent of the module, which is defined by $(\chi_0^i-\Delta/2) \leq \chi \leq (\chi_0^i+\Delta/2)$ and $(\zeta_0^i-\Delta/2) \leq \zeta \leq (\zeta_0^i+\Delta/2)$. Note that the length of the major axis of the ellipse matches the width/height $\Delta$ of the modules and is oriented along the angle $\phi_{c_{s,i}}$. The eccentricity parameter $\epsilon$, representing the ratio of the lengths of the minor and major axes, determines the eccentricity (the eccentricity of the ellipse is directly obtainable from $\epsilon$ as $\sqrt{(1-\epsilon^2)}$) of the elliptical dots, which in turn determines how discernible the changes in orientation are. The process yields the DMQR code $I_0(\chi,\zeta)$ that carries both the primary data $c_p$ and the secondary data $c_s$ embedded, respectively, with intensity and orientation modulation. Note that for conceptual explanation, the primary and secondary message embedding processes has been described sequentially as introducing black elliptical dots within modules and modulating their orientations. In actual practice, however, the encoding and modulation process for the primary message only needs to identify the $N_B$ modules in which the elliptical dots are to be inserted and the dots can then be directly placed within the identified modules with their orientations determined by the (encoded) secondary data, while leaving the other modules blank (white).

Figure 3:
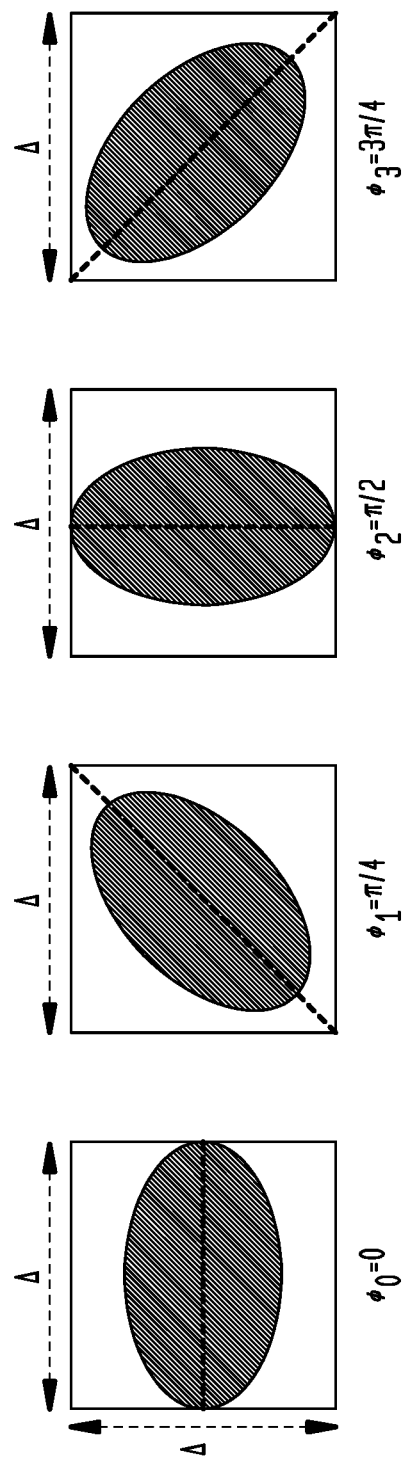
FIG. 3 illustrates M=4-ary orientation modulation for the secondary data.

As an example, FIG. 3 illustrates M=4-ary orientation modulation, where $c_{s,i} \in \{0,1,2,3\}$ and the major axis for the elliptical dots take the four possible orientations $\phi_{c_{s,i}} \in \{0, \pi/4, \pi/2, 3\pi/4\}$. The DMQR code $I_0(\chi,\zeta)$ in FIG. 2 illustrates the complete DMQR code created using this M=4-ary orientation modulation along with a blow-up of a small region that illustrates the dots and their orientations more clearly.

As illustrated in FIG. 2, the decoder operates on a captured image $\tilde{I}(\chi',\zeta')$ from a displayed version $I^d(\chi,\zeta)$ of the DMQR code. Standard algorithms developed for QR codes can identify the locations of the synchronization and alignment patterns within the captured image $\tilde{I}(\chi',\zeta')$. From these locations perspective distortion introduced in the images due to deviations from an ideal fronto-parallel geometry can be estimated and corrected and synchronization can be established to identify the locations of the individual data carrying modules. With synchronization established, for notational simplicity we reuse the coordinate notation and represent the synchronized captured DMQR code image as $I(\chi,\zeta)$. If the localization/synchronization fails, for instance due to low quality of the captured image, a fresh image can be captured as is typical in QR code decoding software applications that keep acquiring and processing frames sequentially while "hunting" for the localization/synchronization patterns.

The embedded primary and secondary messages are decoded from the synchronized captured DMQR code image $I(\chi,\zeta)$ using the procedure shown in the bottom half of FIG. 2. Next we explain the process in turn for the primary and secondary messages.

The primary message is decoded using a conventional QR code decoder. The reader performs intensity demodulation, i.e., estimates a (0/1) bit value for each data carrying module based on whether the module is blank or dark, i.e., whether the module contains a black elliptical dot. By XORing with the binary pattern used for the encoding, an estimate $\hat{c}_p$ of the encoded primary data is first obtained. An error correction decoder corresponding to the error correction code used at the encoder decodes the message $\hat{c}_p$ to recover an estimate of the primary message, $\hat{m}_p$.

Additional secondary symbol synchronization is performed first by estimating which modules contained black elliptical dots, i.e. which modules were not blank. Specifically, using the decoded primary message $\hat{m}_p$, the decoder can estimate the locations of the dot carrying modules by replicating the process used at the encoder for the primary message to identify the modules $\hat{\mathcal{B}}_i$, i=1, 2, . . . $N_B$ that (purportedly) carry the oriented black elliptical dots. Once secondary symbol synchronization is achieved, for simplicity of implementation, we use a version of the efficient heuristic orientation demodulation scheme proposed in Bulan, O., and Sharma, G. 2011. *"High Capacity Color Barcodes: Per Channel Data Encoding via Orientation Modulation in Elliptical Dot Arrays."* IEEE Trans. Image Proc. 20 (5): 1337-50.

The $\overline{I}(\chi,\zeta)$ is binarized (at proximal distances, for which the secondary message can be reliably decoded, we observe very similar performance when decoding from either the binarized image or the captured grayscale image) to obtain $\overline{I}(\chi,\zeta)$ and one-dimensional image moments are computed along the M orientation modulation angles. Specifically, for j=0, 1, . . . (M−1), the image moment along the orientation angle $\phi_j=\pi j/M$ is computed as $$\mu_j^i = \frac{\sum_{\chi,\zeta \in \hat{\mathcal{B}}_i} \overline{I}_r(\chi,\zeta)(x_j - \overline{x}_j)^2}{\sum_{\chi,\zeta \in \hat{\mathcal{B}}_i} \overline{I}(\chi,\zeta)},$$

where $$x_j = \chi\cos\phi_j + \zeta\sin\phi_j,$$

corresponds to the abscissa for the coordinate system obtained by rotating the coordinates $(\chi,\zeta)$ counter-clockwise by the angle $\phi_j$, and $$\overline{x}_j = \frac{\sum_{\chi,\zeta \in \hat{\mathcal{B}}_i} \overline{I}(\chi,\zeta)x_j}{\sum_{\chi,\zeta \in \hat{\mathcal{B}}_i} \overline{I}(\chi,\zeta)},$$

is the coordinate of the abscissa for the center of mass of the binarized image $\overline{I}(\chi,\zeta)$ in the rotated coordinate space. The angle $\phi_j$ that maximizes $\mu_j^i$ determines an estimated symbol $\hat{c}_{s,i}$, which can be mathematically expressed as $$\hat{c}_{s,i} = \underset{j}{\mathrm{argmax}}\mu_j^i.$$

Figure 4:
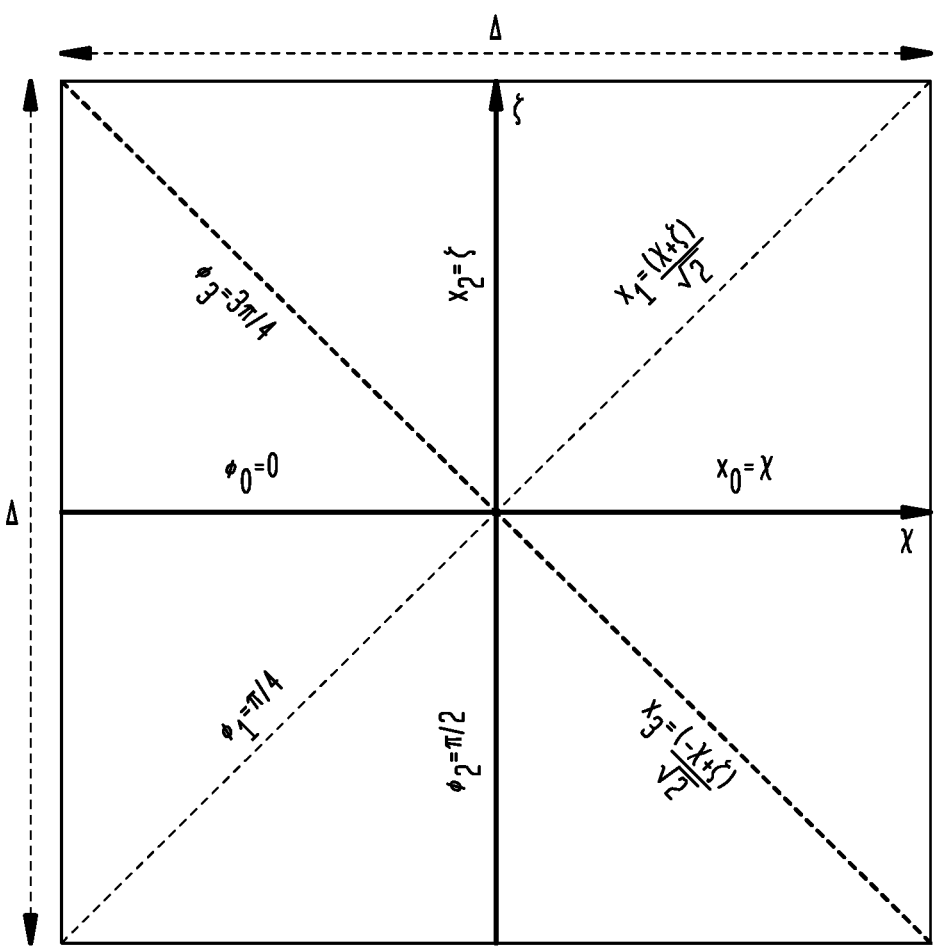
FIG. 4 illustrates the four different axis orientations along which one-dimensional image moments are computed within a module for demodulating the secondary data embedded with the orientation modulation of FIG. 3.

FIG. 4 illustrates the angles $\phi_j$ and the rotated abscissa axes $x_j$ for j=0, 1, 2, 3 for M=4-ary orientation demodulation.

Finally, an error correction decoder corresponding to the code used to encode the secondary message decodes the demodulated secondary data $\hat{c}_s$ to obtain an estimate $\hat{m}_s$ of the secondary message.

Figure 5:
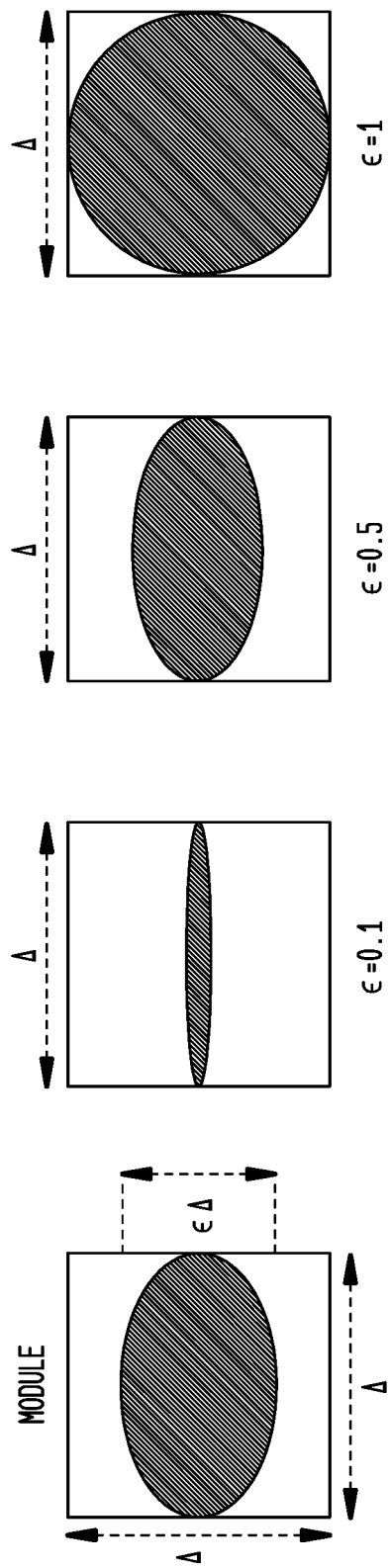
FIG. 5 shows the shape of elliptical dots that are used as markers for different values of the eccentricity parameter.

Apart from parameters inherited from the underlying QR code construction (e.g. module size, error correction level, etc.), DMQR codes have two additional parameters, M, the number of orientations used and $\epsilon$, which controls the eccentricity of the elliptical dots used. The number of orientations M impacts the reliability with which individual secondary modulated symbols can be detected, as is standard in most multi-level modulation schemes for digital communications. The eccentricity parameter $\epsilon$, which ranges between 0 and 1, impacts the modulation for both the primary and secondary data as illustrated in FIG. 5. For a value of $\epsilon=1$, the ellipse becomes a circle and no meaningful orientation modulation is possible. As the value of $\epsilon$ is reduced, the eccentricity of the ellipse increases, making the orientation modulation more apparent. However, this reduces the fraction of the module that is black, which makes it more challenging to distinguish between modules with an ellipse and those without. Thus, the choice of $\epsilon$ trades-off detectability of the primary and secondary data modulations. Larger values of $\epsilon$ are favorable for the primary data modulation because they produce larger changes in the intensity between the blank modules and the modules with the black elliptical dots, however, these larger values are less favorable for the secondary data modulation because the dots become more directionally symmetric, making the orientation modulation harder to decipher. Contrariwise, smaller values of $\epsilon$ are unfavorable to the primary data modulation because they produce smaller changes in the intensity between the blank modules and the modules with the black elliptical dots but these smaller values are more favorable for the secondary data modulation because the dots are less directionally symmetric making the orientation modulation easier to decipher. Thus, if (as is presently preferred) elliptical dots are used as markers in QR codes in accordance with the invention, the appropriate choice of $\epsilon$ is critical.

Figure 10:
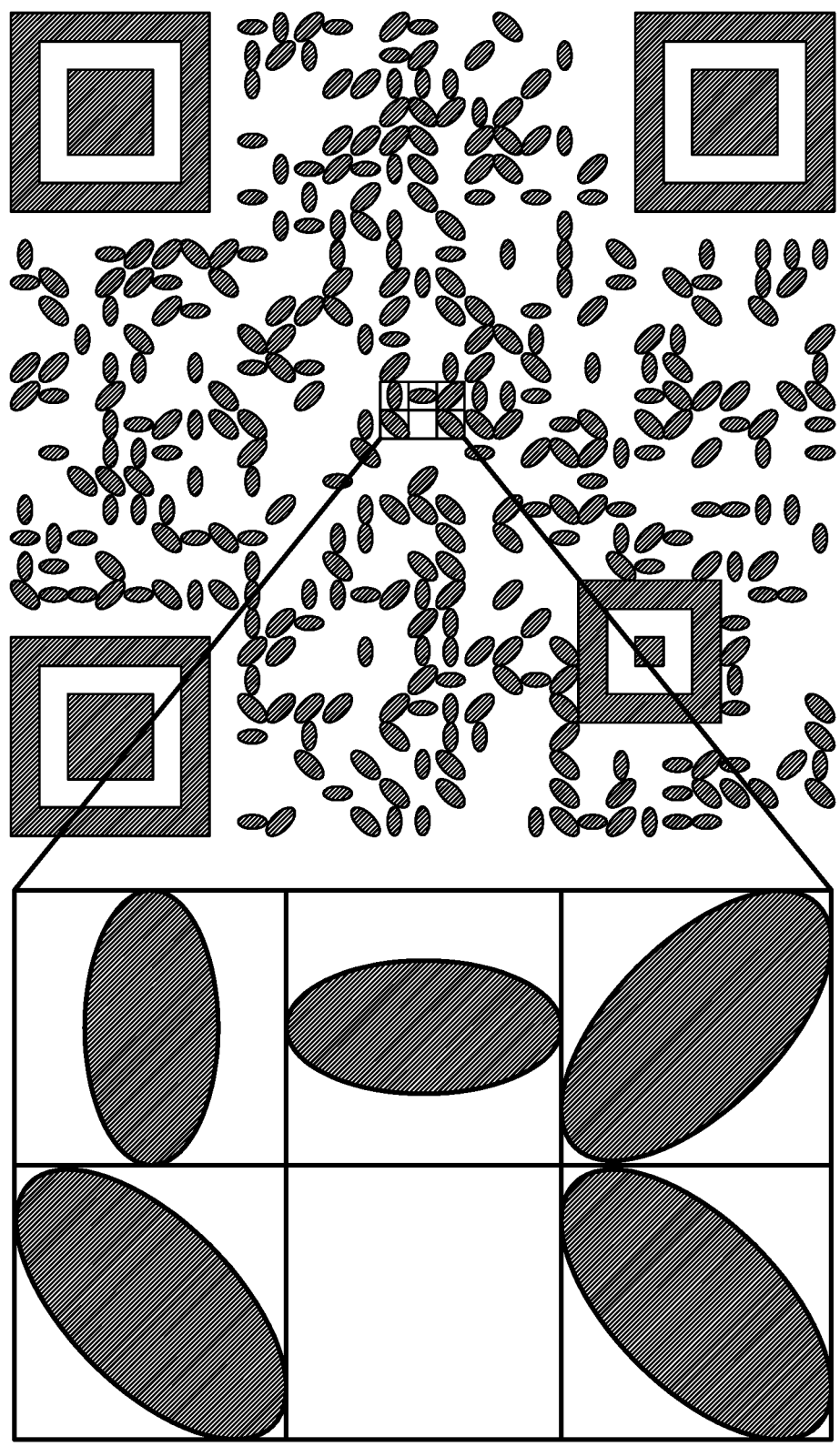
FIG. 10 illustrates how the size of the markers can vary with their orientations.

Furthermore, the size of the dots can be varied with the orientations of the dots. The modulation for DMQR codes can be improved by using black oriented elliptical dots with different sizes for each modulation orientation such that each dot covers the maximum possible area of a square module without exceeding its boundaries. Specifically, as shown in FIG. 10, for each of the modulation orientations, the modulation can use the largest possible elliptical dots of a chosen eccentricity that fit within the modules. This optimized modulation magnifies both the difference in intensity between the light and dark modules that carry the primary data and also the distinction between the orientation statistics used in the secondary data decoding.

Consider the placement of an elliptical dot within its square module in the DMQR code. Specifically, let $(\chi,\zeta)$ denote a 2D orthogonal coordinate system for the DMQR code and consider the region $(\chi_{0_i}-\Delta/2) \le \chi \le (\chi_{0_i}+\Delta/2)$ and $(\zeta_{0_i}-\Delta/2) \le \zeta \le (\zeta_{0_i}+\Delta/2)$ corresponding to the $i^{th}$ elliptical dot containing module, where $(\chi_{0_i},\zeta_{0_i})$ denote the coordinates for the module's center. The perimeter of an elliptical dot centered at $(\chi_{0_i},\zeta_{0_i})$ with its semi-major axis oriented at an angle $\phi_i$ with respect to the $\chi_{0_i}$-coordinate can be described parametrically as $f(t)=(\chi(t), \zeta(t))$ for $0 \le t \le 2\pi$, where $$\chi(t)=a\cos t\cos\phi_i+b\sin t\sin\phi_i+\chi_{0_i}$$

$$\zeta(t)=a\cos t\sin\phi_i-b\sin t\cos\phi_i+\zeta_{0_i}.$$

The parameter $\epsilon=a/b$ determines the eccentricity of the elliptical dots and the orientation $\phi_i=\pi c_{s,i}/M$ is defined by the $i^{th}$ M-ary valued secondary data symbol $c_{s,i}$ (from the M possible orientations 0, $\pi/M$, . . . (M−1)$\pi/M$). To avoid inter-module interference, the length a of the semi-major axis should be chosen so as to ensure that the elliptical dot is contained fully within its module. The horizontal and vertical modulation orientations pose the most stringent constraints on a, and based on these, one could use a fixed value of $a=\Delta/2$. While this constraint ensures that the elliptical dots are contained fully within the modules, the dots for orientations other than horizontal and vertical do not extend to the module boundaries and the modulation is therefore sub-optimal for both the primary data, where larger dots would make the modules darker and better distinguished from the white modules, and for the secondary data, where the different orientations are also better distinguished. To optimize the modulation, we therefore also choose a based on the modulation angle $\phi_j$. Specifically, it can be readily seen that, subject to the aforementioned constraint, the largest possible length of the semi-major axis for the $j^{th}$ modulation orientation angle $\pi j/M$, for $j=0,1,\ldots (M-1)$, is $$a_j = \frac{\Delta/2}{\sqrt{\epsilon^2 \sin^2\left(\frac{\pi j}{M}+\theta_j\right)+\cos^2\left(\frac{\pi j}{M}+\theta_j\right)}},$$

where $\theta_j=\pi/2$ for $M/4<j<3M/4$ and $\theta_j=0$ otherwise.

Figure 6:
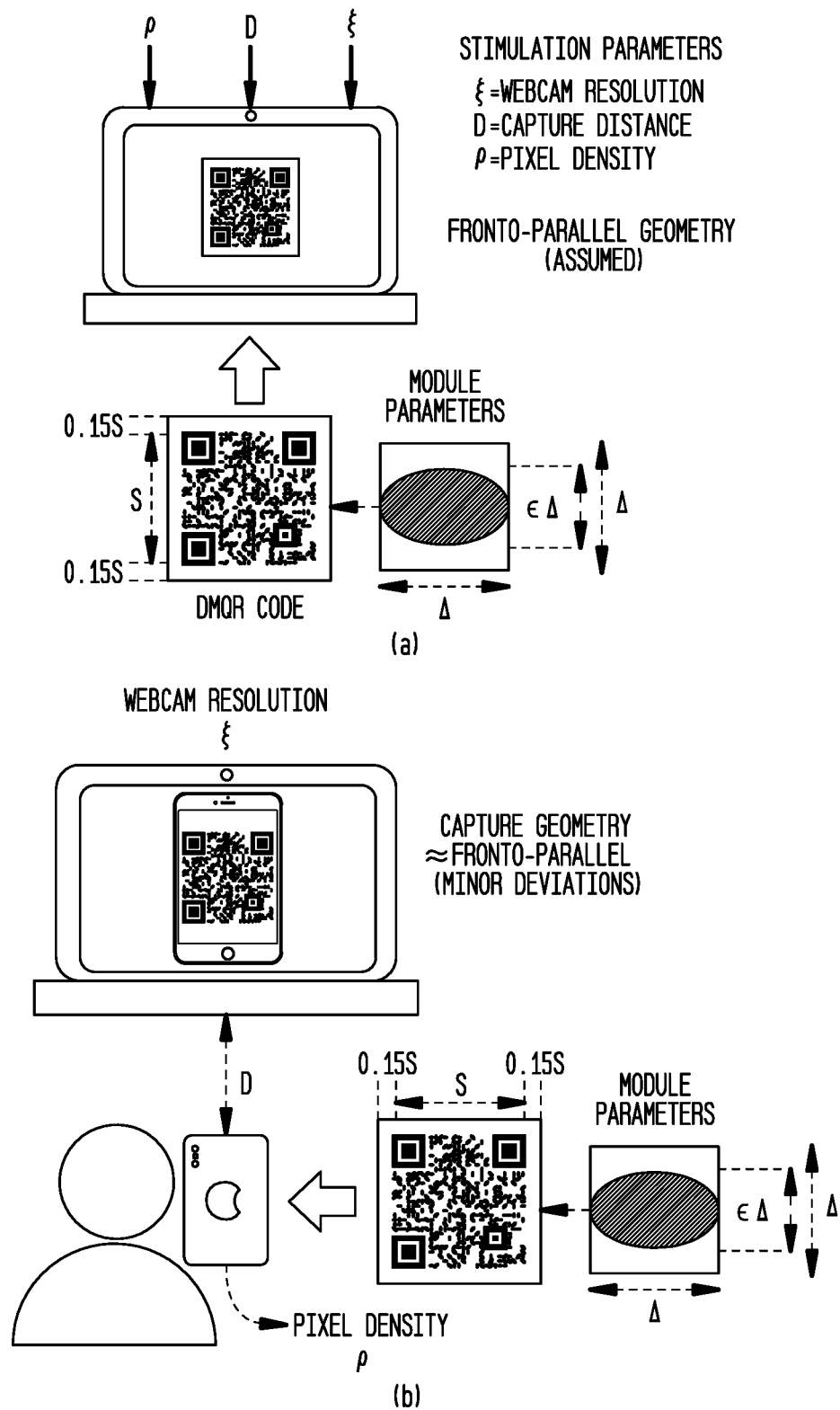
FIG. 6 schematically illustrates the experimental set-up used for simulations and tests of the performance of the preferred embodiment of the invention.

FIG. 6 illustrates the set-up used for both the simulations and for experiments with actual display/capture devices. We first outline the common set-up elements and evaluation metrics used for both, before providing details and results for each.

DMQR codes were created using the encoding process described above with the primary message $m_p$ as a URL and the secondary message as a secure password obtained from a strong password generator website (https://passwordsgenerator.net/). Values M=2, 4, 8 were used for embedding the secondary data. Error correction encoding of the primary and secondary messages was performed using, respectively, the level M error correction ISO/IEC. 2006. "*Information Technology—Automatic Identification and Data Capture Techniques—QR Code* 2005 *Bar Code Symbology Specification.*" http://www.iso.org/iso/iso_catalogue/catalogue_ics/catalogue_detail_ics.htm?csnumber=43655 (a Reed-Solomon code capable of correcting approx. 15% errors) for conventional QR codes and a rate ½ convolutional code Wilson, S. G. 1996. *Digital Modulation and Coding.* Upper Saddle River, N.J., USA: Prentice Hall. We note that to maintain compatibility with conventional QR code decoders, the error correction code for the primary data also needs to be compatible with the QR code standard ISO/IEC. 2006. "*Information Technology—Automatic Identification and Data Capture Techniques—QR Code* 2005 *Bar Code Symbology Specification.*" http://www.iso.org/iso/iso_catalogue/catalogue_ics/catalogue_detail_ics.htm?csnumber=43655, however, error correction for secondary data is not similarly constrained and can be chosen independently from among the many available options. (Another choice for error correction for secondary data is discussed below.) Convolutional codes were chosen in this implementation because they are readily available and the lack of a block-length constraint makes it easy to handle the variable length of the secondary data without having to switch codes. To facilitate synchronization, a uniform blank border 15% of the size S of the DMQR code along each dimension was added. For accomplishing localization and synchronization, and for decoding the primary data, we used ZXing "ZXing C++ Port." https://github.com/glassechidna/zxing-cpp, an open source QR code decoder, that handles the intensity demodulation and error correction decoding of $\hat{c}_p$. Additional implementation details can be found in Appendix A.

It will be noted that error correction need not be (and advantageously should not be) carried out using convolutional codes such as those just described. Modern 5G cellphones utilize channel models and soft decision encoding, and utilizing this alternate error correction technique will improve results when using 5G cellphones without degrading results when using previous generations of cellphones.

For soft-decision decoding, instead of estimating the demodulated secondary data $\hat{c}_s$ and then using in a binary input convolutional decoder, bit-wise log-likelihood ratios (LLRs) $\Lambda$ can be obtained from the orientation demodulation that can be used in more powerful soft-decision decoders. We develop a statistical channel model for the moment based demodulator used for our secondary data, which enables use of state of the art error correction with soft-decision decoding. We express the statistical model for the channel as a conditional probability density function $f_r(r|\phi_j)$, where r is a vector constituted by M image moments obtained from the moment based demodulator whose values depend on the rotation angle $\phi_j$. The conditional density function $f_r(r|\phi_j)$ can be represented in parametric form where the parameters are estimated at the decoder. For instance, deviations from the conditional means given the rotation angle rotation angle $\phi_j$ can be modeled as Gaussian or Laplacian distributions.

To increase secondary message decoding performance, soft-decoding is enabled by exploiting the proposed channel model. Specifically, considering gray coded constellations for the orientation modulation, the channel knowledge is provided as a soft measure for the error correction decoder by using bit-wise log-likelihood ratios (LLRs) $\Lambda$, specifically $$\Lambda(b_l) = \ln\left\{\frac{f_r(\phi_{b:b_l=1}\mid r)}{f_r(\phi_{b:b_l=0}\mid r)}\right\},$$

$$= \ln\left\{\frac{\sum_{b:b_l=1} f_r(\phi_b\mid r)}{\sum_{b:b_l=0} f_r(\phi_b\mid r)}\right\},$$

$$= \ln\left\{\frac{\sum_{b:b_l=1} f_r(r\mid \phi_b)}{\sum_{b:b_l=0} f_r(r\mid \phi_b)}\right\},$$

where b is a vector of bits that represents a gray coded M-ary symbol, and $b_l$ is the $l^{th}$ bit of b, for $l=0, 1, \ldots (\log_2(M)-1)$. Note that the last expression was obtained by considering Bayes' theorem and equiprobable symbols. Furthermore, the notation $\phi_b$ is used instead of $\phi_j$ to show how the bit-wise LLRs $\Lambda$ are computed, and indicate the use of gray coding, which can be handled by the DMQR code decoder without problem.

The decoders for Polar or LDPC codes from the 5G NR standard work with LLRs and the preceding computation of LLRs therefore allows us to encode the secondary message of a DMQR code using these codes (as well as alternative error correction codes that require LLRs for soft decoding).

To characterize performance, for both primary and secondary data we used two evaluation metrics: bit error rate (BER) which characterizes the performance at the modulation subsystem level and decoding success rate (DSR) for the messages, which quantifies the performance for the overall system. Specifically, the BER for the primary and secondary data indicates the percentage of erroneous bits, i.e., the percentage of bits in which $c_p$ differs with $\hat{c}_p$ and $c_s$ differs with $\hat{c}_s$, respectively. Similarly, the DSR for the primary and secondary messages indicates the percentage of barcodes from which the messages $m_p$ and $m_s$, respectively, are successfully recovered after error correction decoding.

The simulations allow us to effectively explore the system performance for different choices of M and the aforementioned trade-off between primary and secondary data modulation robustness over a wide range of values for the eccentricity parameter $\epsilon$, without being overly burdensome in terms of time requirements, and without being impacted by sources of experimental variation (though the simulations do include noise). Specifically, through the simulations, we investigated the performance of DMQR codes for M=2, 4, 8 orientations and values of $\epsilon$=0.1, 0.2, . . . , 1.0.

FIG. 6(a) shows the simulation set-up: the DMQR code is displayed on a screen with pixel density $\rho$ and captured with a webcam with resolution $\xi$ from a distance D in an ideal fronto-parallel geometry. To conduct the simulations, we use the methodology described in Farrell, Joyce E., Peter B. Catrysse, and Brian A. Wandell. 2012. "Digital Camera Simulation." *Appl. Opt.* 51 (4). OSA: A80-A90. doi: 10.1364/AO.51.000A80, for which required software models for the display and the capture camera along with associated signal processing components are available as a toolkit ("ISETCam"). Parameter settings appropriate for our display scenario were obtained by choosing one of the default screen options in "ISETCam." https://github.com/ISET/isetcam, which corresponds to an Apple LCD monitor with a pixel density of $\rho$=326 pixels per inch (PPI) that is comparable to an iPhone 7 display, representing the low end (and therefore more challenging) resolutions likely to be encountered in future applications of DMQR codes. The camera parameters were chosen to correspond to a fixed focus with a sensor resolution $\xi$=1280×720 pixels, which are also representative of the low end of what would be seen in current laptop webcams. Capture distances of D=3, 6, 9, 12, 15.18 inches were simulated. To realistically incorporate the effect of hardware compression that is often integrated within camera capture pipelines, the simulated captured images were stored as JPEG files with a quality factor of 90. Other simulation parameters, including image capture noise, were kept at the default values in "*ISETCam.*" https://github.com/ISET/itetcam. The simulated captured images of DMQR codes on simulated displays were then used as input for our DMQR decoder implementation that was described previously and the BER statistics were computed for both the primary and secondary data over 250 Monte-Carlo simulations. For situations where the decoder failed to localize/synchronize, a BER of ½ corresponding to random guessing was assumed.

Figure 7:
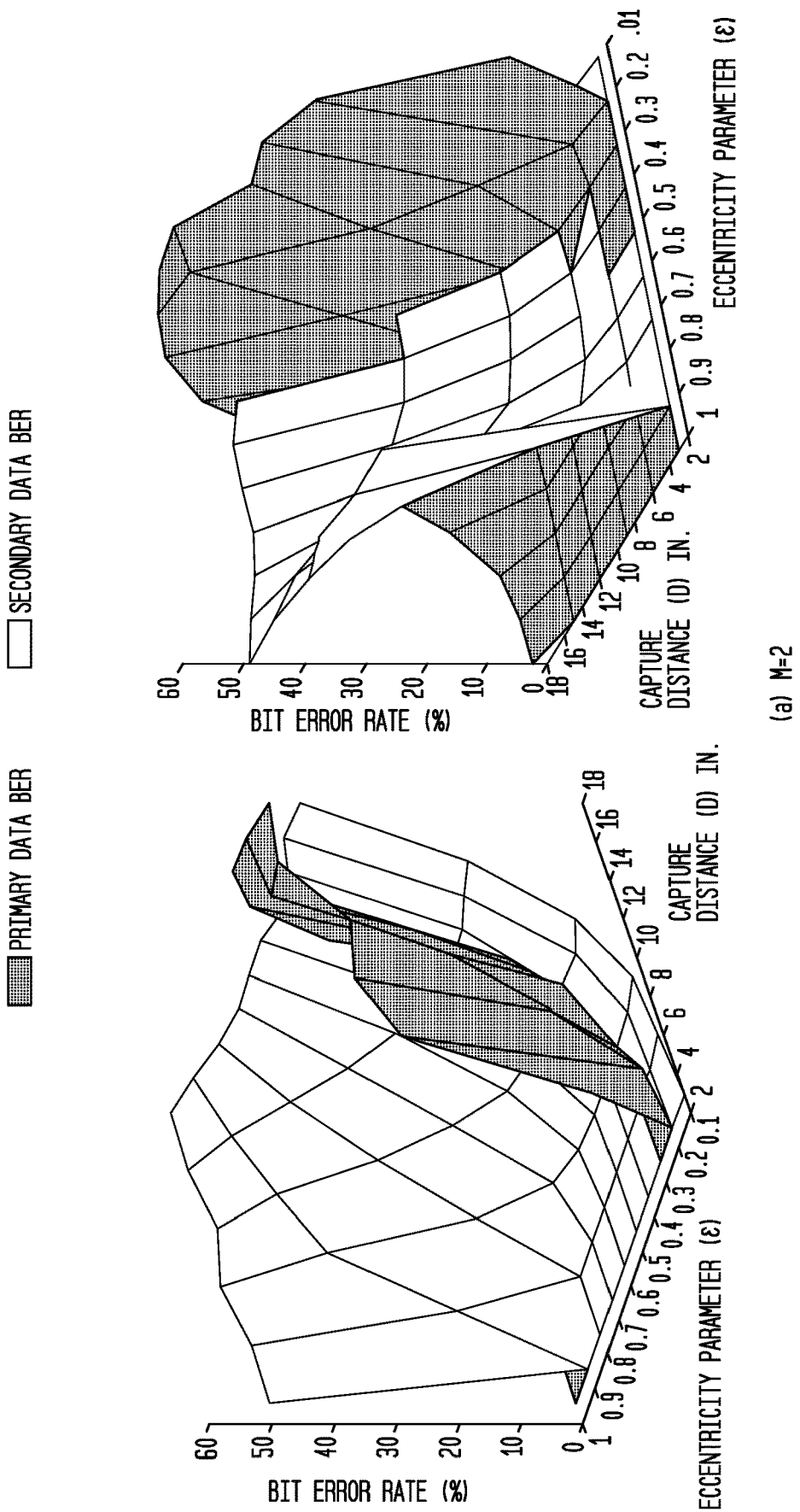
FIG. 7 illustrates the simulated accuracy (expressed as Bit Error Rate, or BER) with which DMQR codes in accordance with the invention can be read in various combinations of tested experimental variables using convolutional codes.
Figure 7:
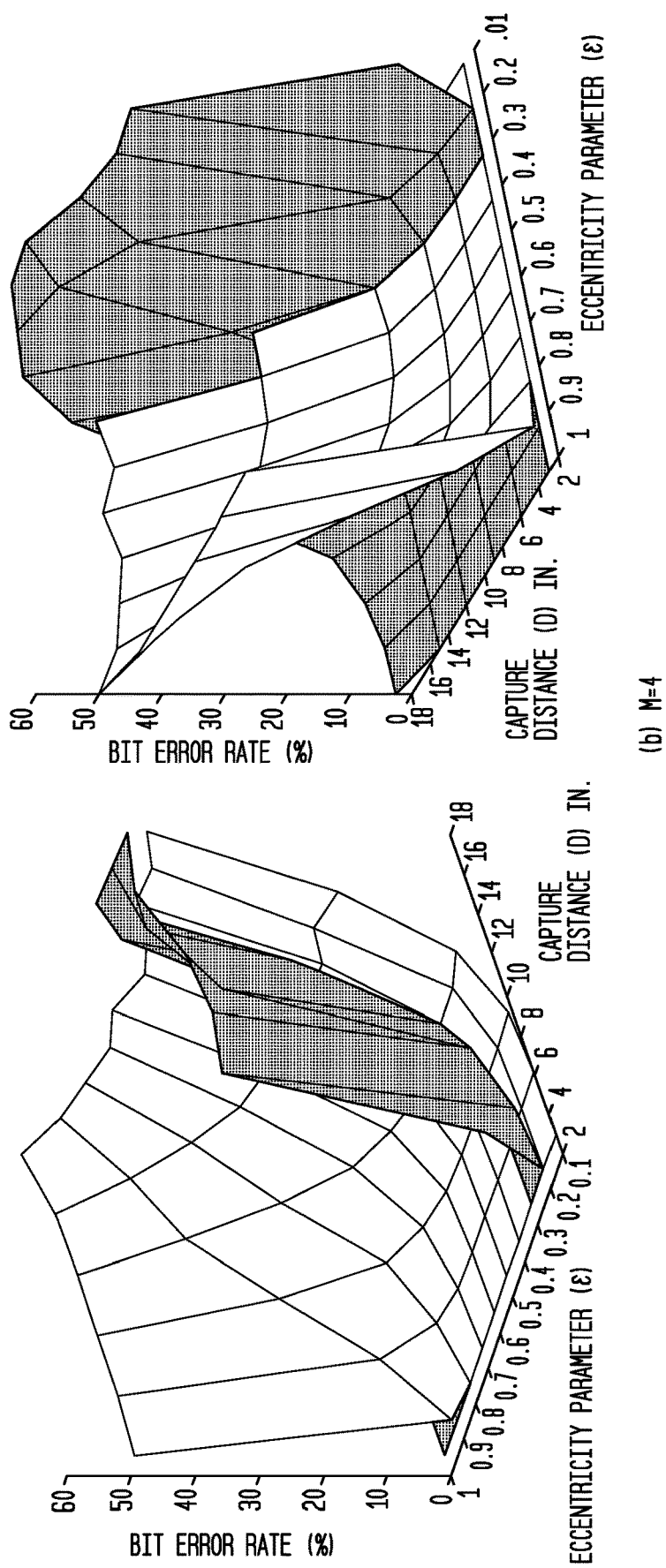

FIG. 7 presents the simulation results. For M=2, FIG. 7(a) presents percent BERs as a function of the eccentricity parameter $\epsilon$ and the capture distance D for the primary and secondary data overlaid as the purple and green 3D surfaces, respectively. Corresponding plots for M=4, and 8 are shown in FIGS. 7(b) and (c), respectively. The plots provide a quantitative representation of the trade-off between the primary and secondary data recoverability as a function of the eccentricity parameter $\epsilon$, which was qualitatively alluded to above. Furthermore, important for our primary motivating application, the plot also indicates how this trade-off changes with the capture distance D. Because the recovery of the primary data is a pre-requisite for secondary symbol synchronization, we first examine the plots from the perspective of the primary data. The plots show that across the range of capture distances simulated, the primary data is recoverable with rather low error rates for values of the eccentricity parameter $\epsilon$ in the range between 0.5 to 0.9. Furthermore, in the simulations, the secondary data exhibits the desirable proximal privacy property: over a significant portion of the aforementioned range of $\epsilon$ the BERs for the secondary data are quite low for small capture distances D but increase quickly with increasing capture distances, approaching the random guessing threshold of ½(50%) at around D=18 in., indicating that no meaningful information about the secondary message is recoverable beyond this distance. Examining the variation in the secondary data BERs across the three different choices of M, we observe that M=2 and 4 offer a reasonable operating envelope in terms of the proximal capture distance D and the eccentricity parameter $\epsilon$, whereas for M=8, the operating envelope is rather small.

The set-up shown in FIG. 6(b) was used for the experiments. A smartphone and a laptop webcam were used for the display and capture, respectively, of the DMQR codes but other aspects mirror the simulation set-up. The pixel density $\rho$ and camera resolution $\xi$ are determined by the actual devices used and the capture distance D is physically varied instead of being simulated. In particular, we selected the capture distances D=6, 9, 12. Based on the simulation results, a subset of the DMQR codes, representing the effective operational range of the parameter space, was selected. Specifically, we chose M=4-ary modulation (experiments on actual devices validated the finding from the simulations that M=8-ary modulation did not work effectively) and eccentricity parameter values of $\epsilon$=0.5, 0.6, 0.7, 0.8, 0.9. Furthermore, as a baseline against which DMQR code performance can be compared, we also tested a traditional QR code carrying the strong password that is embedded as the secondary message in the DMQR codes. A module size and (primary message) error correction level identical to that used in the DMQR codes was used for the conventional QR code.

The experiments used three different smartphones for displaying the DMQR/QR codes and to capture the images of these barcodes for decoding, we use three laptop webcams and a tablet's front facing camera. The specifications for the capture/display devices are listed in Table 1. The captured images were then used for decoding the DMQR/QR codes using our decoder implementation described earlier.

TABLE 1

Display and capture devices used for the experiments

| Capture Devices | Operating System and Capture Software | Camera Resolution (pixels) | JPEG Quality Factor | Display Devices | Pixel Density (PPI) |
|---|---|---|---|---|---|
| HP Pavilion Power 15-cb045wm | Linux Webcamoid | 1280 × 720 | 75 | Xiaomi Mi 8 | 402 |
| Lenovo Yoga 730 | Windows 10 Camera App | 1280 × 720 | 90 | Samsung Galaxy S6 Edge+ | 518 |
| Dell Inspiron 13-7368 | Windows 10 Camera App | 1280 × 720 | 90 | Apple iPhone XR | 326 |
| iPad 6th Generation | iOS Camera App | 1280 × 960 | 100 | | |

FIG. 8 shows the average (across the device combinations) BER for the primary and secondary data as a function of the eccentricity parameter $\epsilon$, where the results are presented in subfigures (a), (b), and (c) corresponding to capture distances D=3,6, and 12 inches. The variance of the secondary data BER is shown as error bars in these plots in order to also depict the extent of variation seen in the results across the devices. Across the range of parameter values, the average BER for the primary data is close to 0 (the average BER for the baseline conventional QR codes is also close to 0 throughout and omitted from the plots because it would completely overlap the primary data BER). Thus, the primary data can be robustly recovered for these choice of parameters and capture distances. For the secondary data, the BERs exhibit expected trends desirable for proximal privacy: BERs rise with increase in the eccentricity parameter $\epsilon$ and with the capture distance D. Choices of $\epsilon$=0.5 and 0.6 allow recovery of the secondary data with fairly low error rates at 6 and 9 in. capture distances. For $\epsilon$=0.9, the secondary data BER is noticeably higher, even at a close capture distance of D=6 inches. On the other hand, the variance of the secondary data BER is low at 6 in. for all values of $\epsilon$, with the exception of $\epsilon$=0.9, and increases with the capture distance.

In addition to the BER, the DSR was also evaluated in the experiments both for the DMQR codes and conventional QR codes. FIG. 9 shows a plot of the DSRs for primary and secondary data for DMQR codes and for the baseline conventional QR codes with their corresponding variances. For the DMQR codes, the same values of eccentricity parameter $\epsilon$ and capture distances D that were used for the BER characterization are represented in these results, whereas for the conventional QR codes, additionally, results from capture distances of D=18, 24, 30, and 36 inches have been included because their performance did not show any degradation over distances under 12 inches. The results validate two important points: the secondary message exhibits the desired proximal privacy property and the choice of the eccentricity parameter $\epsilon$ allows a control of the degree of proximal privacy. For example, a choice of the eccentricity parameter $\epsilon$=0.7 limits reliable recovery of the secondary message in the DMQR codes to a distance of 6 inches. On the other hand, the primary message is decodable from large capture distances and the conventional QR code can be reliably decoded from images captured at 18 inches and in some cases even at 3 feet away. This robustness becomes a disadvantage when one wishes to keep sensitive data private from cameras further than one's immediate proximity.

APPENDIX A

For the DMQR codes, the URL https://labsites.rochester.edu/gsharma/ was used as the primary message $m_p$ and the secure passwords g5r[GRw}^Gu*kk^c:Q)s, g5r[GRw}^Gu*kk^c:Q)s/:Sys7q?cgvA5rCM: !s %, and wUXk_}K7ygV!(5^b\backslash.N8y7,wpK-aT} E-RnQ3>k8G}XtfT4yrbKJdGtu(g5r) served as the secondary messages $m_s$ for M=2, 4 and 8, respectively. The intensity modulated $c_p$ yields an encoded $\tilde{I}_0(\chi,\zeta)$ with 29 modules in the horizontal and vertical directions; thus, $\tilde{I}_0(\chi,\zeta)$ has 29×29=841 modules from which $N_B$=330 (number of modules with ellipses). Error correction for the secondary data utilized a rate ½ maximum free distance binary convolutional code from (Cioffi, n.d. Table 10.1, pp. 160), which was first presented in (Johannesson and Zigangirov 1999). The specific code used the generator polynomials specified in octal by [457,755], which has a constraint length of 9 bits (corresponding to $2^{9-1}$=256 states in the decoder trellis) and a free distance of 12 bits.

As stated above, although the preferred embodiment has been implemented in the format of a QR code, the invention can be implemented in any two-dimensional bar code by encoding data into the bar code modules by using a colored elongated marker instead of a black square and orienting the markers in accordance with the secondary message. A QR code format is not required to practice the invention.

Although a preferred embodiment has been described above, the invention is limited only by the following claims:

The invention claimed is:

1. A method of producing a two-dimensional barcode in which primary message data and secondary message data are encoded using a geometric layout having conventional synchronization patterns, conventional alignment patterns, and conventional data carrying modules, comprising:
   a. encoding binary digit values of the primary message data by rendering the data carrying modules either as blank or as containing an elongated colored marker; and
   b. encoding the secondary message data by varying only the orientations of said markers between at least two of
      i. a vertical orientation,
      ii. a horizontal orientation,
      iii. a first inclined orientation, and
      iv. a second inclined orientation.

2. The method of claim 1, wherein the markers are elliptical.

3. The method of claim 1, wherein the markers are all of identical size.

4. The method of claim 1, wherein vertically and horizontally oriented markers have a first size and markers having inclined orientations have a larger size.

5. A method of extracting primary message data and secondary message data from a video image of a two-dimensional barcode produced using the method of claim 1, comprising:
   a. decoding the primary message data from the image using a conventional two-dimensional barcode decoding method; and
   b. decoding the secondary message data from the orientations of the markers in the image.

6. The method of claim 5, wherein the two-dimensional barcode decoding method is a QR barcode decoding method.

7. The method of claim 1, wherein the conventional synchronization patterns, conventional alignment patterns, and encoding of binary digit values of the primary message data are used in conventional QR code encoding.

* * * * *